Oct. 20, 1953 E. M. ROSCHKE ET AL 2,656,405

AIR KEY SUBSCRIBER TELEVISION SYSTEM

Filed June 28, 1948 2 Sheets-Sheet 1

RICHARD O. GRAY
ERWIN M. ROSCHKE
*INVENTORS*

BY Bruce L Buchanan

*THEIR AGENT*

Oct. 20, 1953 E. M. ROSCHKE ET AL 2,656,405

AIR KEY SUBSCRIBER TELEVISION SYSTEM

Filed June 28, 1948 2 Sheets-Sheet 2

RICHARD O. GRAY
ERWIN M. ROSCHKE
*INVENTORS*

BY Bruce L. Birchard

*THEIR AGENT*

Patented Oct. 20, 1953 2,656,405

UNITED STATES PATENT OFFICE 2,656,405

AIR KEY SUBSCRIBER TELEVISION SYSTEM

Erwin M. Roschke and Richard O. Gray, Broadview, Ill., assignors to Zenith Radio Corporation, a corporation of Illinois Application June 28, 1948, Serial No. 35,698

21 Claims. (Cl. 178—5.1)

This invention relates to subscriber signalling systems similar to those disclosed in copending application Serial No. 773,848, filed September 13, 1947, Roschke, which has now issued as Patent 2,547,598, April 3, 1951, and is assigned to the present assignee.

It is, accordingly, an object of this invention to provide a new and improved subscription television system in which a television signal is transmitted in coded form to be utilized only in subscriber receivers having appropriate decoding apparatus actuated in accordance with the coding schedule employed at the transmitter.

It is another object of the present invention to provide a subscription television transmitter which produces and transmits a coded television transmission including video components, synchronizing components and audio components, and which also produces and transmits as a modulation component of the television transmission a key signal that is related to the coding schedule of the transmission.

It is an additional object of the invention to provide a subscription television receiver for utilizing a coded television transmission including video components, synchronizing components and audio components, and which also utilizes an air-borne key signal related to the coding schedule of the television transmission and constituting a modulation component of the television transmission.

It is still another object of the present invention to provide a subscription television system wherein two key or coding signals, both of which are related to a coding schedule, are utilized to effect encoding of a television signal.

It is an additional object of this invention to provide an electrical signal transmission system in which signals are transmitted in coded form over one channel, conditioning key signals for rendering decoding circuits at subscriber receiver systems effective to decode the coded signals are transmitted over a second channel, and further key signals to actuate the decoding circuits are transmitted over a third channel.

Yet another object of this invention is to provide a receiver system for operation in conjunction with such a transmission system, which receiver system operates to reproduce conventional uncoded signals, such as those transmitted by existing standard transmitting systems, and which receiver further operates to reproduce the above mentioned coded signals in the presence of said conditioning key signals and further key signals.

A still further object of this invention is to provide a transmission system in which signals are transmitted in different modes for successive time intervals, and wherein conditioning key signals are transmitted to subscriber receiver systems at certain times to condition such receivers for changes in the mode of transmission, and wherein further key signals are transmitted to the receivers to indicate the times of these changes of mode so that corrective circuits may be initiated at the receiver systems.

A still further object of this invention is to provide a television system in which television signals are transmitted in different modes for successive time intervals, and wherein conditioning key signals are transmitted by wire line conductor, such as telephone lines, power lines and the like, to subscriber receiving systems to condition such receivers for changes in mode of transmission, and wherein further key signals are transmitted by air, such as on the audio or video carrier, to these receivers to initiate corrective circuits therein simultaneously with each change of mode of transmission.

The features of this invention, which are believed to be new, are set forth with particularity in the appended claims. The invention itself, however, together with further objects and advantages thereof may best be understood by reference to the following description when taken in conjunction with the accompanying drawings, in which:

Figure 1:
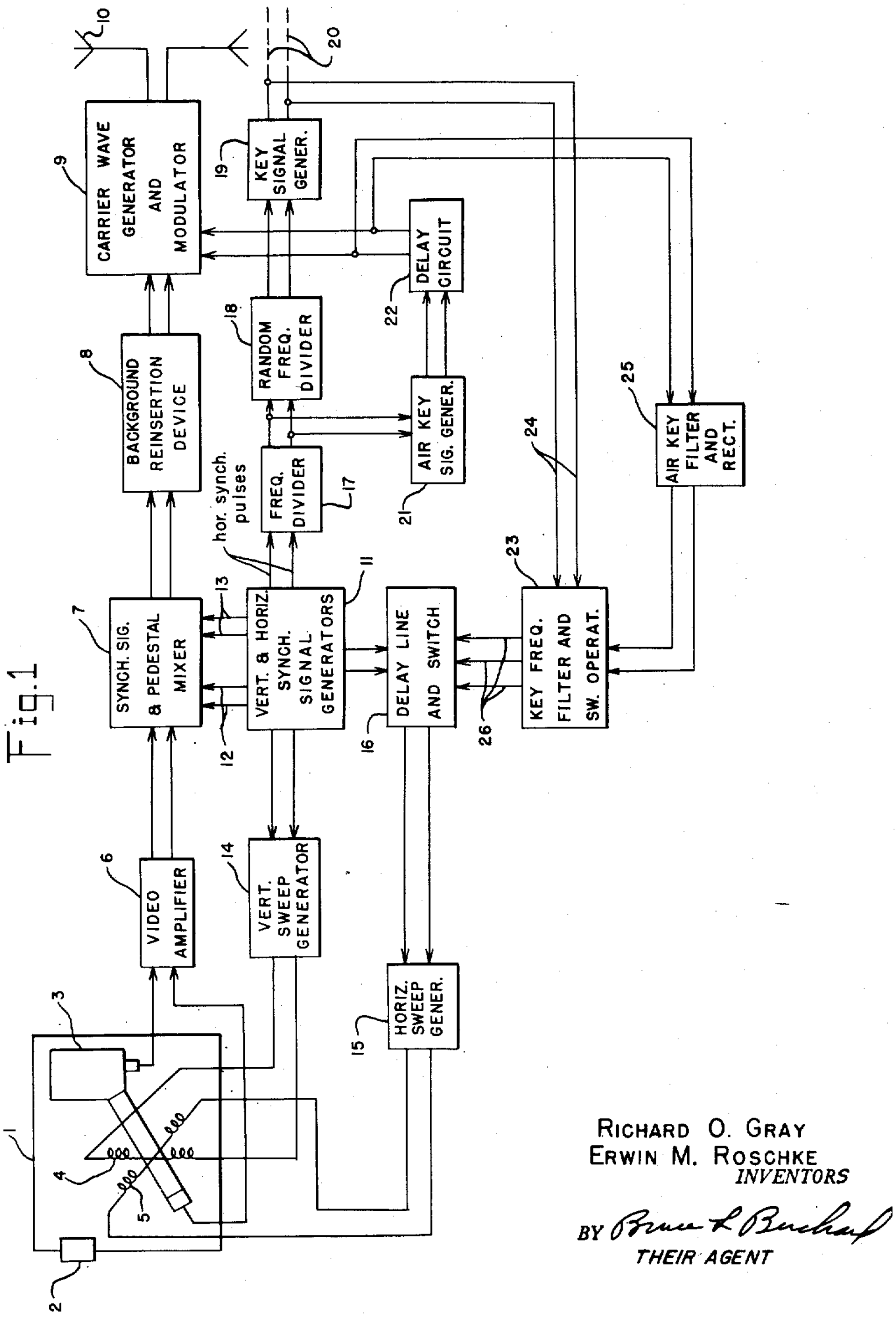
Figure 1 shows one form of transmitter system embodying the invention.

A television transmitter is shown in Figure 1, by means of which television signals are transmitted in two modes, namely in a first mode wherein the video portion of the transmitted signal has a certain time relation with the synchronizing signal portion, and a second mode wherein the video portion has a different time relation with the synchronizing signal portion, changes between these modes being made from time to time in accordance with a predetermined pattern, or in an entirely random manner.

It is to be understood that although the system shown in Figure 1 transmits signals in two different modes, such a system may be arranged to transmit the signals in any number of different modes, changes between these modes being indicated by respective key signals. It is to be further understood that although the modes referred to herein consist of two selected time relations between the video portion and synchronizing signal portion of the transmitted signal, these signals may similarly be transmitted in different modes by inverting from the scanning of the image represented by the video portion, reversing the phase of the video portion, or the like, it being merely necessary to indicate the times of change between modes to subscriber receiver systems, so that corrective circuits at these receivers may be initiated in synchronism with such changes.

It is contemplated in the present invention to add to the difficulty of unauthorized decoding and reception of the transmitted signals by transmitting separate key signals to subscriber receivers on two different channels, these two channels respectively being, preferably, wire line conductor and air, the key signals in the latter channel being conveniently modulated on the video or audio carrier. The wire conducted conditioning key signal is transmitted in advance of the air key signal to condition the receivers for the reception of the air key signal. Moreover, the air key signal initiates a change of mode at the transmitter, and further initiates corrective circuits in the subscriber receiver systems simultaneously therewith. The initiation of the change of mode at the transmitter, and the initiation of the corrective circuits at the receiver by the air key signal occur simultaneously since there is no appreciable time delay in the transmission of this signal.

Referring now to Figure 1, the image transmission system, shown in block form herein, is similar in most respects to the system shown in previously mentioned Patent 2,547,598, and in view of the fact that the components of the present system have either been fully described in the above application or are quite conventional, a detailed description thereof is believed to be unnecessary.

In the arrangement of Figure 1, a television camera 1 contains a lens system 2 for focusing an image upon a television transmitter tube 3, such as an iconoscope or image orthicon, which tube is provided with the usual vertical scanning coil 4 and horizontal scanning coil 5. Video signals developed by iconoscope 3 are amplified by video amplifier 6 and thereafter applied to a synchronizing signal and pedestal mixer 7, in which proper blanking pedestals and synchronizing signals are added to the video signals to produce the desired composite television signals. The television signals are then transmitted to a background re-insertion device 8, and thence to a carrier wave generator and modulator 9, in which the television signal appropriately adjusted as to background level, is modulated on a carrier wave which in turn is radiated from antenna 10.

Vertical and horizontal synchronizing signals are generated by generators 11, these synchronizing signals being impressed respectively on mixer 7 by way of leads 12 and 13. Vertical synchronizing signals from generators 11 are further utilized to initiate vertical sweep generator 14, which in turn impresses sweep signals on vertical scanning coil 4 of tube 3. Horizontal synchronizing signals from generators 11 are applied to a horizontal sweep generator 15 through delay line and switch 16, which may be similar to that disclosed in the aforementioned Patent 2,547,598 and described in detail therein in conjunction with Figure 13. Delay line and switch 16 operates to introduce a delay in the translation of the horizontal synchronizing signals during spaced intervals, thereby periodically to delay the sweep output of generator 15 which output is impressed on the horizontal scanning coil 5 of tube 3. Hence the video signals are delayed from time to time with respect to the synchronizing signals of the transmitted television signal, this transmitted signal being thereby radiated in two different modes, these modes being changed from one form to another upon the actuation of delay line and switch 16.

Horizontal synchronizing pulses from generators 11 are frequency divided in divider 17 to a lower frequency rate so that an appreciable number of lines of the television image are transmitted between changes of mode of the transmitted signal. The frequency divided pulses from divider 17 are further divided by frequency divider 18, which may be similar to that disclosed in the aforementioned Patent 2,547,598 and described in detail therein in conjunction with Figure 11, but is preferably of the random type disclosed in copending application Serial No. 32,457, filed June 11, 1948, now Patent No. 2,588,413, issued March 11, 1952, by Erwin M. Roschke, entitled "Random Frequency Dividers," assigned to the present assignee. The pulses derived from random frequency divider 18 are applied to key signal generator 19 which may be similar to that disclosed in aforementioned Patent 2,547,598 and described in detail therein in conjunction with Figure 12, and a burst of conditioning key signal is produced on conductors 20 in response to each of these randomly divided pulses. Conductors 20 constitute a private link between the transmitter and subscriber receiving systems, which link may comprise telephone lines, power lines or the like, the frequency of the conditioning key signal being such that these lines may carry the conditioning key signal bursts without interference with signals normally carried thereby.

Frequency divided pulses from divider 17 are impressed on air key signal generator 21, which may be similar in construction to key signal generator 19, and a burst of air key signal is derived therefrom in response to each of these frequency divided pulses, the air key signal bursts being of shorter duration than the conditioning key signal bursts. The bursts of air key signal from generator 21 are delayed slightly in delay circuit 22 and these bursts are modulated on the video carrier in stage 9, as shown. The delay of delay circuit 22 is made such that the burst of air key signal appears on the portion of the blanking pedestal immediately following the horizontal synchronizing pulses corresponding to the frequency divided pulses from divider 17. It is apparent that, when so desired, the air key signal may be modulated on the audio carrier, although modulation on the video carrier is preferred.

The bursts of conditioning key signal on conductors 20 are impressed on key frequency filter and switch operator 23 by way of leads 24, and these bursts are rectified and operate to open a gate circuit in stage 23. Stage 23 may be similar to that disclosed in aforementioned Patent 2,547,598 and described in detail therein in conjunction with Figure 14. The bursts of air key signals from delay circuit 22 are rectified in a filter and rectifier stage 25, this stage being sharply tuned to the frequency of these bursts of air key signal, and this stage being similar in arrangement to the filter and rectifier portion of stage 23. Pulses are obtained from stage 25 in response to the bursts of key signal applied thereto, and these pulses are impressed on stage 23. The next succeeding pulse from stage 25 after the gate of stage 23 is open in response to a burst of conditioning key signal on leads 24 causes stage 23 to operate delay line and switch 16 by way of leads 26 to delay the horizontal synchronizing pulses passing therethrough, this delay continuing until the burst of conditioning key signal on lead 24 ceases. Thereafter the next succeeding pulse from stage 25 causes delay line and switch 16 to pass the horizontal synchronizing pulses without delay.

Hence, the transmitter of Figure 1 transmits television signals in two modes, first with the video signals undelayed with respect to the synchronizing signals, and second with the video signals delayed a certain amount with respect to the synchronizing signals. The transmitter is conditioned by the conditioning key signal at random times to change from one mode to another, and the actual change is made at the edge of the picture by the next succeeding divided pulse from divider 17, through stages 21, 25 and 23.

The present system shows the conditioning key signal and air key signal as being controlled by the horizontal synchronizing pulses. However, such control could similarly be effected by the vertical synchronizing pulses, or may even be entirely independent of the synchronizing pulses. In the latter instance frequency divider 17 would be replaced by a self-pulsing pulse generator having any desired frequency rate or a random frequency rate. However, some synchronism is desired to cause the change in modes to occur at the edges of the picture to avoid distortion of the television image.

Figure 2:
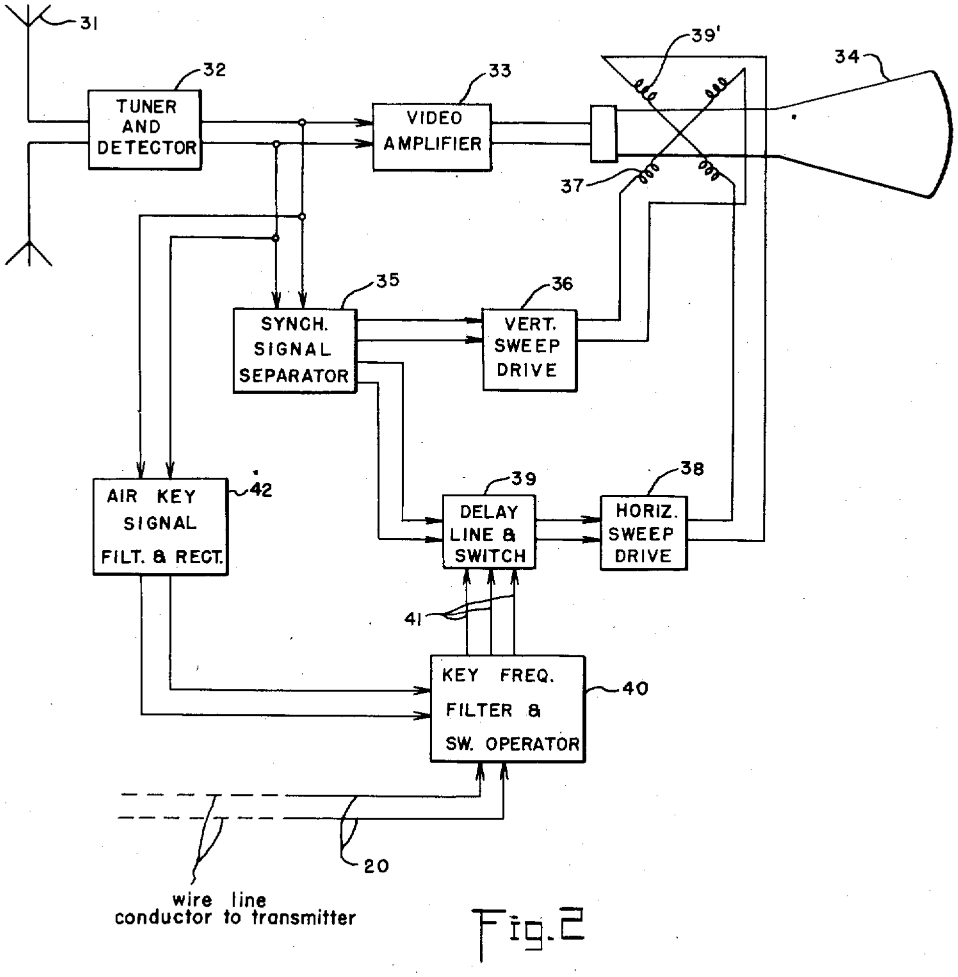
Figure 2 shows a receiver system operating in conjunction with the transmitter of Figure 1.

A receiver suitable for operation with the transmitter of Figure 1 is shown in Figure 2. Referring now to Figure 2, television signals are intercepted by antenna 31, these signals being tuned and detected in tuner and detector stages 32. Detected signals from stage 32 are amplified in video amplifier stages 33, and the amplified signals from stages 33 are impressed on a cathode ray receiver image tube 34, in the usual manner.

Synchronizing signals from the detected television signals are separated therefrom in synchronizing signal separator stage 35, the vertical synchronizing signals thereby obtained being utilized to actuate vertical sweep drive 36, the output of which is applied to the vertical sweep coil 37 of image tube 34. Similarly horizontal synchronizing signals from stage 35 are applied to a horizontal sweep drive 38 through delay line and switch 39 which may be similar to unit 16 at the transmitter, the output of stage 38 being impressed on horizontal sweep coil 39′ of image tube 34.

Delay line and switch 39 is actuated by key frequency filter and switch operator 40 by way of leads 41, so that in response to the conditioning key signals and air key signals the horizontal synchronizing pulses are changed from an undelayed state to a delayed state in synchronism with the changes in mode of the transmitted image. Unit 40, likewise, may be similar to unit 23 at the transmitter. It is preferable that delay line and switch 39 be arranged to pass the horizontal synchronizing signals in their undelayed state in the absence of the key signals, so that the receiver may be tuned to reproduce conventional, uncoded television signals transmitted by standard transmitters without any additional switching operations, and the like.

Conditioning key signals from the transmitter are received over wire lines 20, and each burst of these signals operates a gate in switch 40 to condition this stage to actuate delay line and switch 39 in response to the next succeeding received air key signal.

The air key signal bursts are removed from the video signal by means of air key signal filter and rectifier stage 42 wherein these bursts are rectified and impressed on stage 40. Unit 42 may be similar to the filter and rectifier 25 of the transmitter. As in the case of the transmitter, the stage 40 is first conditioned for the reception of pulses from stage 42 by means of the conditioning key signals received over the wire lines 20; and the next succeeding air key pulse from the stage 42, which indicates that the received television signal has been changed from one mode to the other, causes the operator stage 40 to actuate the delay line and switch 39 to correct the receiver operation to compensate for this change in mode.

While a particular embodiment of the invention has been shown and described herein, modifications may be made without departing therefrom. It is intended in the appended claims to cover any such modifications as fall within the true spirit and scope of the invention.

We claim:

1. A subscription type of television transmitter comprising: a picture-converting device; a scanning system for controlling said device to develop during recurrent trace intervals a video-frequency signal representing a subject scanned by said device and including a synchronizing-signal generator for developing during interposed retrace intervals a synchronizing signal; a mixer device coupled to said picture-converting device and to said synchronizing-signal generator for producing a television signal which includes in alternation said video-frequency signal and said synchronizing signal; a first key-signal generator coupled to said synchronizing-signal generator for producing a first key signal having a repetition frequency different from that of said synchronizing signal; a second key-signal generator coupled to said synchronizing-signal generator for producing a second key signal having a repetition frequency different from that of said synchronizing signal and for supplying said second key signal to a line circuit extending to a point remote from said transmitter; apparatus coupled to said first and second key-signal generators and responsive to the joint application of said first and second key signals to alter a characteristic of said television signal during spaced time intervals to effect coding of said television signal; and means coupled to said mixer device and to said first key-signal generator for modulating said coded television signal and said first key signal on a carrier wave for radiation to said remote point.

2. A subscription type of television transmitter comprising: a picture-converting device; a scanning system for controlling said device to develop during recurrent trace intervals a video-frequency signal representing a subject scanned by said device and including a synchronizing-signal generator for developing during interposed retrace intervals a synchronizing signal; a mixer device coupled to said picture-converting device and to said synchronizing-signal generator for producing a television signal which includes in alternation said video-frequency signal and said synchronizing signal; a first key-signal generator coupled to said synchronizing-signal generator and controlled thereby to generate bursts of a first key signal at a repetition frequency that is a submultiple of the repetition frequency of said synchronizing signal; a second key-signal generator coupled to said synchronizing-signal generator and controlled thereby to generate bursts of a second key signal at a random repetition frequency and for supplying said bursts to a line circuit extending to a point remote from said transmitter; apparatus included in said scanning system and responsive to the joint application of said bursts of said first and second key signals to alter a characteristic of said television signal during spaced time intervals to effect coding of said television signal; and means coupled to said mixer device and to said first key-signal generator for modulating said coded television signal and said first key signal on a carrier wave for radiation to said remote point.

3. A subscription type of television transmitter comprising: a picture-converting device; a scanning system for controlling said device to develop during recurrent trace intervals a video-frequency signal representing a subject scanned by said device and including a synchronizing-signal generator for developing during interposed retrace intervals a synchronizing signal; a mixer device coupled to said picture-converting device and to said synchronizing-signal generator for producing a television signal which includes in alternation said video-frequency signal and said synchronizing signal; a first key-signal generator coupled to said synchronizing-signal generator and controlled thereby to generate bursts of a first key signal at a repetition frequency that is a submultiple of the repetition frequency of said synchronizing signal; a second key-signal generator coupled to said synchronizing-signal generator and controlled thereby to generate bursts of a second key signal occurring in time coincidence with said synchronizing signal but at a repetition frequency different from that of said first key-signal bursts and for supplying said second key-signal bursts to a line circuit extending to a point remote from said transmitter; apparatus included in said scanning system and responsive to the joint application of said bursts of first and second key signals for alternating a characteristic of said television signal during spaced time intervals to effect coding of said television signal; and means coupled to said mixer device and to said first key-signal generator for modulating said coded television signal and said first key signal on a carrier wave for radiation to said remote point.

4. A subscription type of television transmitter comprising: a picture-converting device; a scanning system for controlling said device to develop during recurrent trace intervals a video-frequency signal representing a subject scanned by said device and including a synchronizing-signal generator for developing during interposed retrace intervals a synchronizing signal; a mixer device coupled to said picture-converting device and to said synchronizing-signal generator for producing a television signal which includes in alternation said video-frequency signal and said synchronizing signal; a first key-signal generator coupled to said synchronizing-signal generator and controlled thereby to generate bursts of a first key signal having a repetition frequency different from that of said synchronizing signal; a second key-signal generator coupled to said synchronizing-signal generator and controlled thereby to generate bursts of a second key-signal occurring in time coincidence with said synchronizing signal but at a repetition frequency different from that of said synchronizing signal and for supplying said second key-signal bursts to a line circuit extending to a point remote from said transmitter; coding apparatus included in said scanning system and coupled to said second key-signal generator and conditioned by said second key-signal bursts during spaced time intervals corresponding thereto; means for supplying said first key-signal bursts to said coding apparatus to actuate said apparatus solely when so conditioned, thereby altering a characteristic of said television signal during said spaced time intervals to effect coding of said television signal; and means coupled to said mixer device and to said first key-signal generator for modulating said coded television signal and said first key signal on a carrier wave for radiation to said remote point.

5. A subscription type of television transmitter comprising: a picture-converting device; a scanning system for controlling said device to develop during recurrent trace intervals a video-frequency signal representing a subject scanned by said device and including a synchronizing-signal generator for developing during interposed retrace intervals a synchronizing signal; a mixer device coupled to said picture-converting device and to said synchronizing-signal generator for producing a television signal which includes in alternation said video-frequency signal and said synchronizing signal; a first key-signal generator coupled to said synchronizing-signal generator and controlled thereby to generate bursts of a first key signal having a repetition frequency different from that of said synchronizing signal; a second key-signal generator coupled to said synchronizing-signal generator and controlled thereby to generate bursts of a second key-signal occurring in time coincidence with said synchronizing signal but at a repetition frequency different from that of said synchronizing signal and for supplying said second key-signal bursts to a line circuit extending to a point remote from said transmitter; coding apparatus included in said scanning system and coupled to said second key-signal generator and conditioned by said second key-signal bursts during spaced time intervals corresponding thereto; a delay circuit coupled to said first key-signal generator for supplying said first key-signal bursts with a time delay short compared to the burst intervals to said coding apparatus to actuate said apparatus solely when so conditioned, thereby altering a characteristic of said television signal during said spaced time intervals to effect coding of said television signal; and means coupled to said mixer device and to said delay circuit for modulating said coded television signal and said delayed first key signal on a carrier wave for radiation to said remote point.

6. A subscription type of television receiver for utilizing a coded composite television signal and a first key signal received over a first signal channel, and a second key signal received over a line circuit, said television signal including video-signal components and synchronizing-signal components, and said receiver including: an image-reproducing device and an associated scanning system; apparatus for supplying said television signal to said device and its scanning system; decoding apparatus coupled to said line circuit and responsive to the joint application of said first and second key signal for effectively decoding said television signal; and means for separating said first key signal from said television signal and for supplying said first key signal to said decoding apparatus.

7. A subscription type of television receiver for utilizing a coded composite television signal and a first key signal received over a first signal channel, and a second key signal received over a line circuit, said television signal including video-signal components and synchronizing-signal components, and said receiver including: an image-reproducing device and an associated scanning system; apparatus for supplying said television signal to said device and its scanning system; decoding apparatus included in said scanning system and coupled to said line circuit, said apparatus being responsive to the joint application of said first and second key signals for effectively decoding said television signal; and a filter circuit for separating said first key signal from said television signal and for supplying said first key signal to said decoding apparatus.

8. A subscription type of television receiver for utilizing a coded composite television signal and a first key signal received over a first signal channel; and a second key signal received over a line circuit, said television signal including video-signal components and synchronizing-signal components, and said receiver including: an image-reproducing device and an associated scanning system; apparatus for supplying said television signal to said device and its scanning system; decoding apparatus included in said scanning system and coupled to said line circuit to be conditioned by said second key signal; and means for separating said first key signal from said television signal and for supplying said first key signal to said decoding apparatus to actuate said apparatus when in its conditioned state, thereby causing said apparatus effectively to decode said television signal.

9. A subscription type of television system comprising: a picture-converting device; a scanning system for controlling said device to develop during recurrent trace intervals a video-frequency signal representing a subject scanned by said device and including a synchronizing signal generator for developing during interposed intervals a synchronizing signal; a mixer device coupled to said picture-converting device and to said synchronizing-signal generator for producing a television signal which includes in alternation said video-frequency signal and said synchronizing signal; a first key-signal generator coupled to said synchronizing-signal generator for producing a first key signal; a subscriber receiver; a second key-signal generator coupled to said synchronizing-signal generator for producing a second key signal and for supplying said second key signal to a line circuit extending to said receiver; apparatus coupled to said first and second key-signal generators and responsive to the joint application of said first and second key signals to effect coding of said television signal; means coupled to said mixer device and to said first key-signal generator for modulating said coded television signal and said first key signal on a carrier wave for radiation to said receiver; said receiver including an image-reproducing device and an associated scanning system, apparatus for supplying said television signal to said device and its scanning system, decoding apparatus coupled to said line circuit and responsive to the joint application of said first and second key signals for effectively decoding said television signal, and means for separating said first key signal from said television signal and for supplying said first key signal to said decoding apparatus.

10. A subscription type television receiver for utilizing a coded television signal including video components and snychronizing components and for utilizing a first key signal related to the coding schedule of said television signal; said receiver comprising: an image-reproducing device for synthesizing an image in response to said video components; a scanning system for synchronizing said reproducing device in response to said synchronizing components; decoding apparatus for effectively decoding said television signal as applied to said reproducing device; means for deriving said first key signal; additional means for deriving a second key signal also related to said coding schedule of said coded signal; and means coupled to both of said deriving means for utilizing said first key signal and said second key signal for controlling said decoding apparatus in accordance with said coding schedule of said coded television signal to effect decoding thereof.

11. A subscription type television receiver for utilizing a coded television signal including video components and synchronizing components and for utilizing a first key signal related to the coding schedule of said television signal; said receiver comprising: an image-reproducing device for synthesizing an image in response to said video components; a scanning system for synchronizing said reproducing device in response to said synchronizing components; decoding apparatus for effectively decoding said television signal as applied to said reproducing device; means for deriving said first key signal; additional means for deriving a second key signal also related to said coding schedule of said coded signal; and means coupled to both of said deriving means and conjointly responsive to said first key signal and said second key signal for controlling said decoding apparatus in accordance with said coding schedule of said coded television signal to effect decoding thereof.

12. A subscription type television receiver for utilizing a radiated coded television signal including video components and synchronizing components and for utilizing an air-borne first key signal related to the coding schedule of said television signal; said receiver comprising: an image-reproducing device for synthesizing an image in response to said video components; a scanning system for synchronizing said reproducing device in response to said synchronizing components; decoding apparatus for effectively decoding said television signal as applied to said reproducing device; means for deriving said first key signal; additional means for deriving a second key signal also related to said coding schedule of said coded signal; and means coupled to both of said deriving means for utilizing said first key signal and said second key signal for controlling said decoding apparatus in accordance with said coding schedule of said coded television signal to effect decoding thereof.

13. A subscription type television receiver for utilizing a coded television signal including video components, synchronizing components, and key-signal components related to the coding schedule of said television signal, said receiver comprising: an image-reproducing device for synthesizing an image in response to said video components; a scanning system for synchronizing said reproducing device in response to said synchronizing components; decoding apparatus for effectively decoding said television signal as applied to said reproducing device; means for deriving said key-signal components; additional means for deriving a second key signal also related to said coding schedule of said coded signal; and means coupled to both of said deriving means for utilizing said key-signal components and said second key signal for controlling said decoding apparatus in accordance with said coding schedule of said coded television signal to effect decoding thereof.

14. A subscription type of television receiver for utilizing a coded television signal including video components and synchronizing components and for utilizing a first key signal representing a portion of the coding schedule of said television signal, said receiver comprising: an image-reproducing device for synthesizing an image in response to said video components; a scanning system for synchronizing said reproducing device in response to said synchronizing components; decoding apparatus for effectively decoding said television signal as applied to said reproducing device; means for deriving said first key signal; additional means for deriving a second key signal representing another portion of the coding schedule of said television signal; and means coupled to both of said deriving means for utilizing said first key signal and said second key signal for controlling said decoding apparatus in accordance with said coding schedule of said coded television signal to effect decoding thereof.

15. A subscription type of television system for utilizing a coded television signal including video components and synchronizing components comprising: an image-reproducing device for synthesizing an image in response to said video components; a scanning system for synchronizing said reproducing device in response to said synchronizing components; decoding apparatus for effectively decoding said television signal as applied to said reproducing device; a source of a first key signal related to the coding schedule of said coded television signal; a source of a second key signal also related to the coding schedule of said coded television signal; and means coupled to both of said sources for utilizing said first key signal and said second key signal for controlling said decoding apparatus in accordance with said coding schedule of said coded television signal to effect decoding thereof.

16. A subscription type of television system for utilizing a coded television signal including video components and synchronizing components comprising: an image-reproducing device for synthesizing an image in response to said video components; a scanning system for synchronizing said reproducing device in response to said synchronizing components; decoding apparatus for effectively decoding said television signal as applied to said reproducing device; a plurality of sources of key signals each representing at least a portion of the coding schedule of said coded television signal; and means coupled to said plurality of sources for utilizing said plurality of key signals for controlling said decoding apparatus in accordance with said coding schedule of said coded television signal to effect decoding thereof.

17. A subscription type of television system for utilizing a coded television signal including video components and synchronizing components comprising: an image-reproducing device for synthesizing an image in response to said video components; a scanning system for synchronizing said reproducing device in response to said synchronizing components; decoding apparatus for effectively decoding said television signal as applied to said reproducing device; a source of a first key signal related to the coding schedule of said coded television signal; a source of a second key signal also related to the coding schedule of said coded television signal; and means coupled to both of said sources conjointly responsive to said first key signal and said second key signal for controlling said decoding apparatus in accordance with said coding schedule of said coded television signal to effect decoding thereof.

18. A subscription type of television transmitter comprising: a picture-converting device; a scanning system for controlling said device to develop during recurrent trace intervals a video signal representing a subject scanned by said device and including a synchronizing-signal generator for developing during interposed retrace intervals a synchronizing signal; a mixer device coupled to said picture-converting device and to said synchronizing-signal generator for producing a television signal which includes in alternation said video signal and said synchronizing signal; a first key-signal source for developing a first key signal; a second key-signal source for developing a second key signal; coding apparatus coupled to said key-signal sources and responsive jointly to said first and second key signals for effecting coding of said television signal in accordance with a coding schedule related to said first and second key signals; and means coupled to said mixer device for modulating said coded television signal on a carrier wave for radiation to a remote point.

19. A subscription type of television transmitter comprising: a picture-converting device; a scanning system for controlling said device to develop during recurrent trace intervals a video signal representing a subject scanned by said device and including a synchronizing-signal generator for developing during interposed retrace intervals a synchronizing signal; a mixer device coupled to said picture-converting device and to said synchronizing-signal generator for producing a television signal which includes in alternation said video signal and said synchronizing signal; a first key-signal source for developing a first key signal; a second key-signal source for developing a second key signal; coding apparatus coupled to said key-signal sources and responsive jointly to said first and second key signals for effecting coding of said television signal in accordance with a coding schedule related to said first and second key signals; and means coupled to said mixer device and to said first key-signal source for modulating said coded television signal and said first key signal on a carrier wave for radiation to a remote point.

20. A subscription type television receiver for utilizing a coded television transmission including video components, synchronizing components and audio components and for utilizing an airborne key signal related to the coding schedule of said television transmission and constituting a modulation component of said television transmission, said receiver comprising: an image-reproducing device for synthesizing an image in response to said video components; a scanning system for synchronizing said reproducing device in response to said synchronizing components; circuit means for receiving said television transmission and for supplying said video components to said reproducing device and said synchronizing components to said scanning system; decoding apparatus included in said circuit means for effectively decoding said television transmission; a selector network coupled to said circuit means for separating said key signal from said television transmission; and means for utilizing the key signal from said selector network to control said decoding apparatus in accordance with said coding schedule to effect decoding of said television transmission.

21. A subscription type of television transmitter comprising: a picture converting device; a scanning system for controlling said device to develop during recurrent trace intervals a video signal representing a subject scanned by said device and including a synchronizing signal generator for developing during interposed retrace intervals a synchronizing signal; a mixer device coupled to said picture converting device and to said synchronizing signal generator for producing a composite television signal; a key signal source for developing a key signal; coding apparatus coupled to said key signal source and responsive to said key signal for effecting coding of said television signal in accordance with a coding schedule related to said key signal; and means coupled to said mixer device for modulating said television signal and said key signal on a carrier wave for radiation to a remote point.

ERWIN M. ROSCHKE.
RICHARD O. GRAY.

References Cited in the file of this patent

UNITED STATES PATENTS

| Number | Name | Date |
|---|---|---|
| 1,754,876 | Clements | Apr. 15, 1930 |
| 2,124,394 | Browne | July 19, 1938 |
| 2,203,758 | Walker | June 11, 1940 |
| 2,293,870 | Weis | Aug. 25, 1942 |
| 2,310,197 | Hansell | Feb. 2, 1943 |
| 2,402,067 | Mathes | June 11, 1946 |
| 2,403,059 | Dillenback | July 2, 1946 |
| 2,406,977 | Wendt | Sept. 3, 1946 |
| 2,419,568 | Labin | Apr. 29, 1947 |
| 2,458,368 | Kamin | Jan. 4, 1949 |
| 2,510,046 | Ellett et al. | May 30, 1950 |
| 2,567,545 | Brown | Sept. 11, 1951 |
| 2,573,349 | Miller et al. | Oct. 30, 1951 |
| 2,574,462 | Brown | Nov. 13, 1951 |

FOREIGN PATENTS

| Number | Country | Date |
|---|---|---|
| 386,849 | Great Britain | Jan. 26, 1933 |